United States Patent [19]

Damico et al.

[11] 4,194,940

[45] Mar. 25, 1980

[54] METHOD OF BONDING EMPLOYING AN ADHESIVE COMPOSITION CONTAINING POLYISOCYANATE REACTION PRODUCTS HAVING AN AVAILABLE ISOCYANATE CONTENT OF NOT MORE THAN 0.5 PERCENT

[75] Inventors: Dennis J. Damico; Brian Martin, both of Erie, Pa.

[73] Assignee: Lord Corporation, Erie, Pa.

[21] Appl. No.: 930,962

[22] Filed: Aug. 4, 1978

Related U.S. Application Data

[63] Continuation of Ser. No. 738,414, Nov. 3, 1976, abandoned.

[51] Int. Cl.² .......................... B32B 31/00; C09J 3/00; D02G 3/00

[52] U.S. Cl. ..................... 156/331; 156/166; 156/180; 156/308; 156/309; 156/327; 428/288; 428/289; 428/375; 428/393; 428/395; 428/457; 428/474; 428/480; 428/901; 428/423.7; 428/423.5; 428/425.1

[58] Field of Search ............... 156/331, 309, 308, 327, 156/313, 166, 180, 181; 528/64, 65, 375, 395; 428/480, 474, 457, 458, 424, 288, 901, 289, 393

[56] References Cited

U.S. PATENT DOCUMENTS

| | | | |
|---|---|---|---|
| 3,188,302 | 6/1965 | Lorenz | 528/63 |
| 3,393,210 | 7/1968 | Speck | 260/37 N |
| 3,945,876 | 3/1976 | Blanca | 156/331 |
| 3,956,561 | 5/1976 | Anderson et al. | 428/901 |
| 3,969,568 | 6/1976 | Sperley | 428/298 |

*Primary Examiner*—Lorraine T. Kendell
*Attorney, Agent, or Firm*—John A. Gazewood

[57] ABSTRACT

Thermoplastic elastomeric materials are bonded to a variety of substrates over a broad range of temperatures and pressure by employing an adhesive system comprising thermoplastic polyether urethane.

12 Claims, No Drawings

METHOD OF BONDING EMPLOYING AN ADHESIVE COMPOSITION CONTAINING POLYISOCYANATE REACTION PRODUCTS HAVING AN AVAILABLE ISOCYANATE CONTENT OF NOT MORE THAN 0.5 PERCENT

This is a continuation of application Ser. No. 738,414, filed Nov. 3, 1976, now abandoned.

This invention relates to bonding of elastomeric compositions. More particularly, the invention relates to a method for bonding thermoplastic elastomeric compositions to reinforcing fibers and to the resulting composite structures.

Laminates and composite structures wherein natural and synthetic elastomers are adhesively bonded to natural and synthetic reinforcing fibers are well-known. A variety of adhesive compositions have been employed in forming such structures with many of the prior art compositions being limited to specific elastomers and/or specific reinforcing fibers. In most cases, particularly wherein the reinforcing fiber is a synthetic organic fiber, it has been virtually impossible to obtain adequate bonding in the absence of a pretreatment of the fiber surface. Generally, the ultimate bond has been effected at elevated temperatures sufficient to effect vulcanization of the elastomer with simultaneous curing of the adhesive formulation.

The recent introduction of thermoplastic elastomers has stimulated considerable interest in developing applications for these unusual materials. As their name implies, thermoplastic elastomers exhibit properties characteristic of chemically cross-linked elastomers, but they differ from vulcanized rubbers in that they will soften and flow at elevated temperatures. Such elastomers are fully polymerized, high molecular weight, non-reactive, fully thermoplastic materials which exhibit many of the desirable characteristics of cross-linked elastomers which can be formed by conventional processes of the plastics industry such as injection molding, rotational molding, extrusion, coating and milled casting but which, unlike conventional natural and synthetic elastomers, do not require post-curing to obtain full strength and dimensional stability. Because of their excellent heat and chemical stability, high modulus at low elongations, good abrasion resistance, low temperature flexibility, and resistance to cut growth, the thermoplastic elastomers are excellent candidates for such demanding applications as flexible couplings for power transmission, drive belts, hoses for hydraulic fluid, and the like. For those applications wherein the thermoplastic elastomer is in a molten state at temperatures of 177° C. or higher, such elastomers can be bonded to various flexible and non-flexible substrates such as fabric, fiber, metal, and the like using many of the heat activatable adhesive compositions which are presently conmmercially available. However, there are many proposed applications wherein the thermoplastic elastomer is preformed to a specific configuration and subsequently bonded to an appropriate substrate, or the substrate itself is heat sensitive. The use of heat-activatable adhesives in such situations is patently undesirable. Thus there is a need for adhesive systems which can bond thermoplastic elastomers at moderate temperatures in order to retain the dimensional stability of the elastomer, the substrate, or both elements.

Of the many adhesive types which are known to the art, only the thermoplastic polyurethanes appear to have any facility to bond thermoplastic elastomers to various substrate materials at moderate temperatures. The acceptance of thermoplastic polyurethane adhesive systems as bonding agents for thermoplastic elastomers can be described as conditional, since these adhesive systems are not without problems. Among such problems are unexplainable viscosity variations from batch to batch, even though each batch is manufactured under substantially identical conditions; inconsistency in adhesive performance; insolubility in conventional adhesive solvents; high heat activation temperatures; and the presence of relatively large amounts of low molecular weight fractions which contribute to poor peel strength and poor bond strength and/or relatively large amounts of high molecular weight fractions which are substantially insoluble, even in strong adhesive solvents. Quite often, even when adhesive performance is otherwise acceptable, the use of thermoplastic polyurethane adhesives is accompanied by an undesirable embrittling, which is more prevalent when the substrate to which the thermoplastic elastomer is bonded is a synthetic fiber material. Embrittling is particularly noticeable when the reinforcing fiber or substrate is one of the newly developed polyaramid resins such as Kevlar (trademark, E. I. du Pont de Nemours & Co.).

The present invention provides adhesive lacquer compositions which are effective to bond thermoplastic segmented copolyester elastomer compositions to themselves and to other flexible and non-flexible substrates at ambient temperatures while at the same time providing a substantially flexible bond with a minimum of embrittlement.

More particularly, in accordance with the present invention there are provided flexible polyurethane-based lacquer systems which have been found to effectively bond thermoplastic segmented copolyester elastomer materials to themselves over a wide range of temperatures, including especially ambient temperature, and which do not cause deleterious embrittlement of the bonded assembly; composite structures comprising such thermoplastic elastomer materials; and a method for adhesively bonding such thermoplastic elastomers to flexible and non-flexible substrates.

Thermoplastic elastomers can be described as copolymers consisting of two types of blocks, one of which is an amorphous chain segment with a relatively low glass transition temperature. These amorphous blocks are commonly referred to as "soft" segments because they impart elastomeric character to the polymer. The second component, the "hard block" is a chain segment which is capable of undergoing intermolecular association to form a thermally reversible network structure. The physical crosslinks resulting from this association prevent long range flow in the absence of chemical crosslinks. These noncovalent bonds can be broken at elevated temperatures, however, and hence the structure is thermoplastic. One the average, there must be at least two such hard blocks per molecule to insure formation of a three-dimensional network structure.

The thermoplastic segmented copolyester elastomers which are bonded in accordance with the present invention to form useful composite structures consist essentially of short chain ester units (hard blocks) and long chain ester units (soft blocks) joined through ester linkages, the short chain ester units being derived from the reaction of low molecular weight diols and dicarboxylic acids and the long chain ester units being derived from the reaction or long chain glycols with dicarboxylic acids. Representative dicarboxylic acids include aliphatic, cycloaliphatic and aromatic acids such as maleic acid, 1,4-cyclohexane dicarboxylic acid, adipic acid, succinic acid, oxalic acid, azelaic acid, allylmalonic acid, 4-cyclohexen-1,2-dicarboxylic acid, 4,4'-bicyclohexyl dicarboxylic acid, terephthalic acid, phthalic acid, isophthalic acid, 1,5-naphthalene dicarboxylic acid, and the like, with the aromatic dicarboxylic acids being presently preferred. Representative low molecular weight diols include aliphatic, cycloaliphatic and aromatic dihydroxy compounds, with diols having from 2 to 15 carbon atoms such as ethylene, tetramethylene and decamethylene glycols, dihydroxy cyclohexane, resorcinol, 1,5-dihydroxy naphthalene, bis(p-hydroxy) diphenyl, bis(p-hydroxyphenyl) methane, and the like being preferred. Especially preferred at this time are aliphatic diols having from 2 to 8 carbon atoms. Long chain glycols will generally have a molecular weight in excess of 350, with molecular weights in the range from about 600 to about 3000 being preferred and include poly(alkylene ether) glycols in which the alkylene group has from 2 to 9 carbon atoms such as poly(ethylene ether) glycol, poly(propylene ether) glycols, poly(tetramethylene ether) glycol, poly(octamethylene ether) glycol, and random or block copolymers thereof, for example, glycols derived from ethylene oxide and 1,2-propylene oxide; glycol esters of poly(alkylene oxide) dicarboxylic acids; polyester glycols; poly formals; polythioether glycols, and the like. It will be appreciated that the foregoing listing is but a short listing of the acids, diols, and long chain glycols which can be employed to form thermoplastic segmented copolyester elastomers. Such elastomers are well-known articles of commerce and their preparation is detailed in numerous United States patents, as well as many foreign patents.

The preferred segmented copolyester elastomers are those in which the dicarboxylic acid is aromatic dicarboxylic acid of 8 to 16 carbon atoms, the low molecular weight diol is aliphatic diol of 2 to 8 carbon atoms, and the long chain glycol is poly(alkylene ether) glycol in which the alkylene group has from 2 to 9 carbon atoms. Particularly preferred copolyester elastomers which are bonded in accordance with the invention are those prepared from dimethyl terephthalate, 1,4-butanediol and poly(tetramethylene oxide) glycol having a molecular weight in the approximate range of about 600–2000 or poly(ethylene oxide) glycol having a molecular weight of about 600–1500. Optionally, up to about 30 mole % and preferably 5–20 mole % of the dimethyl terephthalate in these polymers can be replaced by dimethyl phthalate or dimethyl isophthalate. Other preferred copolyesters are those prepared from dimethyl terephthalate, 1,4-butanediol, and poly(1,2-propylene oxide) glycol having a molecular weight of about 600–1600. Up to 30 mole % and preferably 10–25 mole % of the dimethyl terephthalate can be replaced with dimethyl isophthalate or butanediol can be replaced with neopentyl glycol until up to about 30% and preferably 10–25% of the short chain ester units are derived from neopentyl glycol in these poly-(-propylene oxide) glycol polymers. The polymers based on poly(tetramethylene oxide) glycol are especially preferred because they are easily prepared, have overall superior physical properties, and are particularly resistant to water.

The thermoplastic elastomers can be compounded with the conventional rubber additives, including conventional inorganic fillers, such as carbon black, silica gel, alumina, rutile, clays and chopped fiber glass. In general, these additives have the effect of increasing the modulus of the thermoplastic elastomer at various elongations. Compositions having a range of hardness values can be obtained by blending hard and soft thermoplastic elastomers.

The substrates to which the segmented copolyester elastomers described hereinbefore are bonded by the process of this invention include fiber-forming condensation polymers and regenerated cellulose, solid plastics, natural and synthetic elastomers, leather, metals, and the like. The phrase "fiber-forming condensation polymers" is used to indicate that the composition of the substrate can be formed into useful fibers. The phrase is not intended to limit the form of the substrate to fibers or to structures derived from fibers such as threads, cords and fabrics. Other forms of the substrate can be utilized such as filaments, rods, tubes, films and sheets. Regenerated cellulose is intended to include products such as rayon. All four main types of rayon e.g., acetate, cupraammonium, nitrocellulose and viscose would, of course, fall within the definition of rayon. The process of this invention can also be used to adhere the copolyester to complex or irregular substrate surfaces as long as proper mating surfaces are provided for bonding.

Representative fiber-forming condensation polymers which are intended to be used as substrates in the process of this invention are, as indicated previously, those substances capable of forming fibers. Typically, the fibers are formed at molecular weights of >5000. Specific categories for these include the polyesters, e.g., poly(ethyleneterephthalate) which are discussed at length in the Encyclopedia of Polymer Science and Technology, Interscience Publishers, 1969, Vol. 11, Pages 62–128, which are herein incorporated by reference. Other polyesters which are intended to be included within the scope of this invention are poly-(p-hydroxyethoxybenzoate) and poly(cyclohexanedimethyleneterephthalate). Polyamides such as poly(hexamethyleneadipamide), polycaprolactam and poly(11-amino undecanoic acid) are also within the scope of the instant invention. The polyamides are discussed at length in the Encyclopedia of Polymer Science and Technology, Supra, Vol. 10, Pages 483–597 which are incorporated herein by reference. Polyurethanes such as that derived from hexamethylene diisocyanate and 1,4-butanediol are also included; polyurethanes are discussed in the Encyclopedia of Polymer Science and Technology, Supra, Vol. 11, Pages 506–563 which are also incorporated herein by reference. A discussion of regenerated cellulose is to be found in the Encyclopedia of Polymer Science and Technology, Supra, Vol. 11, Pages 810–847. This too is herein incorporated by reference.

The present invention is especially suitable for bonding the herein-described segmented copolyester thermoplastic elastomers to the recently developed aramid fibers. The aramid fibers are commercially available under trademarks such as "Fiber B," "Kevlar," "DP-101," and "Nomex," as well as others. Aramid is the generic name for fibers made from the condensation product of isophthalic acid or terephthalic acid and m-phenylenediamine or p-phenylenediamine. "Fiber B" and "Kevlar" are generally understood to be products of the condensation of terephthalic acid and p-phenylenediamine and "Nomex" is understood to be a product of the condensation of isophthalic acid and m-phenylenediamine. Aramid is defined as "a manufactured fiber in which the fiber forming substance is a long-chain synthetic aromatic polyamide in which at least 85% of the amide linkages are attached directly to two aromatic linkages." Aramid fibers are discussed in further detail, including composition and preparation, in U.S. Pat. No. 3,393,210, incorporated herein by reference.

Bonding of segmented copolyester thermoplastic elastomer compositions to flexible and non-flexible substrates in accordance with the present invention is accomplished by employing as a bonding phase disposed between the elastomer composition and the substrate an adhesive lacquer system comprising solvent-carried thermoplastic polyether urethane. Thermoplastic polyurethanes per se are well-known in the art and can be described as relatively high molecular weight, nonreactive, i.e., having substantially no free hydroxyl or isocyante moieties, thermoplastic materials.

Broadly, the thermoplastic polyurethanes which are suitable for use in the practice of the present invention comprise the reaction product of at least one polyether glycol having at least two hydroxyl groups, at least one polyisocyanate having at least two isocyanate groups, and a difunctional chain extender, said reaction product having a molecular weight in the range from about 20,000 to about 200,000, preferably from about 40,000 to about 160,000, and having a residual free isocyanate content of no greater than about 0.5 percent. In preferred embodiments, the free isocyante content is effectively zero percent.

The polyether polyols which are employed in the present invention are selected from the group consisting of polyalkylene ether glycols having at least two terminal hydroxy groups, and having molecular weights in the range from about 300 to about 6,000, preferably from about 400 to about 2,000. Such polyethers are well-known in the art under one or more generic names, viz, polyalkylene glycols, polyoxyalkylene oxide clycols, polyglycols, polyglycol ethers, polyalkylene ether glycols and the like. These polyethers are ordinarily derived from the polymerization of cyclic ethers such as alkylene oxides, tetrahydrofuran or dioxolane or from the condensation of glycols. Polyglycols formed by the polymerization of mixtures of different hydroxyl-containing materials, such as a mixture of glycols, can be used. Typical of the polyether polyols which can be used are polyoxyethylene glycol, polyoxypropylene glycol, polyoxybutylene glycol, polytetramethlene glycol, block copolymers, e.g., combinations of polyoxyethylene and polyoxypropylent glycols, polyoxyethylene and poly-1,2-oxybutylene glycols and polyoxyethylene and poly-1,4-oxybutylene glycols, and the like.

Substantially any polyisocyante containing two or more isocyanate groups can be employed in forming thermoplastic polyurethanes in accordance with the present invention, with diisocyanates being presently preferred. Representative polyisocyanates include 2,4-toluene diisocyanate, 2,6-toluene diisocyanate, hexamethylene diisocyanate, diphenylmethane-p-p'-diisocyanate, dicyclohexylmethane-4,4'-diisocyanate, isophorone diisocyanate, polymethylene poly(phenylisocyanate), and the like.

The difunctional chain extenders which are employed in the practice of the invention are preferably selected from the group consisting of dihydric alcohols, aliphatic and aromatic amines, and amino alcohols, with dihydric alcohols having from 2 to 8 carbon atoms being presently preferred. Representative difunctional chain extenders include, without limitation, ethylene glycol, propylene glycol, 1,3-butadiene glycol, neopentyl glycol, diethylene glycol, dipropylene glycol, 1,4-butanediol, 1,6-hexanediol, 1,8-octanediol, 2-methyl-2,4-pentanediol, ethylenediamine, hexamethylenediamine, p-p'-diaminodiphenylmethane, hydroxyethylamine, hydroxybutylamine, and the like, with 1,4-butanediol being presently preferred.

The flexible thermoplastic polyurethane adhesive systems employed in the practice of this invention are prepared by a process comprising reacting in an adhesive solvent at least one polyether polyol, and at least one polyisocyanate, at an isocyanate:hydroxyl ratio of at least 1.01:1, preferably in the range from about 1.5–5:1, and continuing the reaction in such solvent to an endpoint corresponding to at least 90, preferably 100, percent depletion of hydroxyl functions to form an isocyanate-functional polyurethane intermediate; further reacting in such solvent said polyurethane intermediate with not more, preferably less, than a stoichiometric amount, based on free isocyanate content of said intermediate, of at least one difunctional chain extending reagent, to a solution viscosity in said adhesive solvent in the range from about 1,000 to about 10,000 cps, preferably about 1,750 to about 7,500 cps, at 100° C. Total solids content in each step is as hereinafter specified. In order to ensure the substantial absence of free isocyanate and/or hydroxyl functions, the difunctional chain extender is preferably employed in less than a stoichiometric amount and, when the desired solution viscosity has been obtained, there is added to the reaction mixture at least one monofunctional isocyanate-reactive chain terminating reagent in an amount at least sufficient to react with any unreacted isocyanate moieties.

It has been found beneficial in many instances to include from about 0.1 to about 1, preferably from 0.01 to about 0.1 percent by weight, based on the weight of polyether polyol of at least one chain-branching monomeric polyol having at least three hydroxyl groups such as trimethylol propane, 1,1,1-trimethylethane, glycerol, trimethylolbenzene, 1,2,6-trihydroxy hexane, pentherythritol, and the like.

Substantially any of the known chain-terminating reagents can be employed in the practice of this invention. It is deemed sufficient to state that such reagents are monofunctional with respect to isocyanate reactivity. Suitable chain terminators include aliphatic and aromatic alcohols such as methanol, isopropanol, isobutanol, cyclopentanol, phenol, and the like; secondary amines such as diphenylamine; and oximes such as phenylethylketoneoxime, to name but a few. As indicated, the amount of chain terminating reagent which is added after the polyurethane intermediate has been chain extended to the desired solution viscosity is not critical; it should be at least sufficient to insure effective deactivation of any remaining unreacted isocyanate functions at the desired viscosity end point.

It will be appreciated that the thermoplastic polyurethanes are prepared in the presence of an adhesive solvent system, thus providing an adhesive lacquer which can be packaged into a suitable container as it is withdrawn from the reaction vessel. A single solvent in which the individual reactants and reaction products are mutually soluble can be employed. Mixed solvent systems are also operable provided the solvents are mutually compatible. Representative solvents include ethyl acetate, isopropyl acetate, butyl acetate, acetone, methyl ethyl ketone, methyl butyl ketone, cyclopentanone, cyclohexanone, 1,4-dioxane, N,N'-dimethylacetamide, N-methyl-pyrrolidone, tetramethyl urea N-hexane, benzene, toluene, and the like, including mixtures of two or more of any of the solvents. Preferred solvent systems include ethyl acetate/acetone (80/20) and ethyl acetate/methyl ethyl ketone (80/20). In preparing the herein-described thermoplastic polyurethane adhesive systems, the reaction step in which the polyurethane intermediate is formed is effected in the presence of sufficient adhesive solvent to afford a total solids content, based on non-volatile components, in the range from about 40 to about 75, preferably from about 50 to about 65, percent. The subsequenty chain-extension reaction is effected in the presence of sufficient adhesive solvent to afford a total solids content, based on non-volatile components, in the range from about 25 to about 45, preferably from about 30 to about 40, percent. Generally, reaction conditions are within the range normally employed in the art for preparing polyurethanes, except for temperature, which must be maintained below the boiling point of the adhesive solvent system. The solvent system is maintained throughout at a level sufficient to keep the total solids content within the specified ranges.

It has been found that improved heat resistance can be imparted to the adhesive systems of the present invention by incorporating therein from about 0.5 to about 10, preferably from about 1 to about 5, parts by weight per 100 parts by weight of thermoplastic polyurethane of at least one aliphatic and/or aromatic polyisocyanate. Representative of such polyisocyanates are toluene diisocyanate, p,p'-diphenylmethane diisocyanate, 1,6-hexamethylene diisocyanate, methylene-bis-cyclohexyl isocyanate), isophorone diisocyanate, polymethylene poly(phenyl isocyanate), methane-triphenylisocyanate, trimethylol propane-toluene diisocyanate adducts, toluene diisocyanate dimer, (p,p'-isocyanato phenyl)phosphate, and the like.

Bond formation between the segmented copolyester thermoplastic elastomer and the substrate is accomplished by applying the thermoplastic polyurethane adhesive lacquer composition to either or both of the thermoplastic elastomer and the substrate, contacting the surfaces involved and maintaining contact until bonding occurs under the action of heat and/or pressure. Because of the large number of applications in which the present inventive concept can be utilized, the methods of applying the adhesive lacquer compositions and forming the bond can be varied considerably. The adhesive lacquers can be applied by any means consistent with viscosity of the lacquer such as spraying, brushing, dip coating, roll coating, and the like.

Actual bond formation is accomplished by contacting the thermoplastic elastomer and the substrate under the action of pressure with or without heating after application of the thermoplastic polyurethane adhesive lacquer composition. It is preferred that the adhesive composition be permitted to dry prior to contacting of the elastomer and substrate surfaces. Where bonding is accomplished at ambient temperatures, as is desired in many instances including in the case of aramid fiber substrates, the application of sufficient pressure to maintain contact is usually continued for a period of 12 to 120 hours. The time required to form satisfactory bonds can be reduced by increasing the temperature during the bonding cycle. For example, at temperatures in the range of 160° to 230° C., bonding can be effected with the application of pressure in about 1 to about 10 minutes. Generally, temperatures in the range from ambient to near the melting point of the thermoplastic elastomer can be employed. Pressures will normally be in the range from about 1 to about 200 psi, although higher pressures can be employed if necessary. A particularly convenient method of bonding involves applying the adhesive lacquer composition to the reinforcing fiber on a hose tube and immediately applying molten thermoplastic elastomer by doctoring or crosshead extruding onto the adhesive-coated substrate. Bond formation proceeds with sufficient rapidity under these conditions that bonding can be accomplished by the time the thermoplastic elastomer has solidified.

The method of the present invention is particularly useful for preparing composite structures such as braided hose, flat belting, V-belts, and coated fabrics. The structures prepared in accordance with the present invention are more flexible and exhibit significantly less embrittling than those prepared from conventional adhesives such as epoxides which rigidize the structures. Significantly higher adhesion values are obtained through the use of thermoset polyether urethane adhesive lacquers than are obtained with polyester-based thermoplastic polyurethane compositions. When low temperature flexibility is a consideration, the flexible characteristics of the polyether-based thermoplastic polyurethane adhesive lacquers again provide a decided advantage over other adhesive systems, including simple isocyanates.

The examples which follow further illustrate the invention. All parts, proportions and percentages are by weight unless otherwise indicated.

EXAMPLES

Adhesive Lacquer A is prepared by reacting one mol of polycaprolactone diol having a molecular weight of about 2,000 and 2 moles toluene diisocyanate in 12 parts by weight, based on weight of diol and diisocyanate, of methyl ethyl ketone adhesive solvent at a temperature of 80° C. in the presence of a catalytic amount of dibutyl tin dilaurate. The reaction is continued to an endpoint corresponding to a percent depletion of hydroxyl functions of at least 90 percent (at least 90 percent of isocyanate functions have reacted) as determined by titration for percent NCO. When the endpoint is reached, there are added 1 mol 1,4-butanediol chain-extending reagent in 25 parts by weight (same weight basis as before) methyl ethyl ketone. The chain extending step is continued to a viscosity endpoint of 2,500 centipoises at 70° C.; terminated by the addition of 0.2 moles methyl ethyl ketone oxime; and additional methyl ethyl ketone is added to afford an adhesive lacquer composition having a total solids content of 30 percent.

Adhesive Lacquer B is prepared in a manner identical to that employed in the preparation of Adhesive Lacquer A, except that the adhesive solvent in a 50/50 mixture of trichloroethylene and methylene chloride and the final total solids content is 20 percent.

Adhesive Lacquer C is prepared in a manner identical to that employed in the preparation of Adhesive Lacquer A, except that the polymeric polyol is polycaprolactone having a molecular weight of about 830, the polyisocyanate is methylene-bis(cyclohexylisocyanate), the chain-extender reagent is isophorone diamine, the adhesive solvent is a 50/50 mixture of toluene and isopropanol, and the final total solids content is 25 percent.

Adhesive Lacquer D is prepared in a manner identical to that employed in preparing Adhesive Lacquer A, except that there are used 0.875 moles methylene-bis(-cyclohexylisocyanate), 0.178 moles polycaprolactone diol having a molecular weight of about 2,000 and 0.322 moles polycaprolactone diol having a molecular weight of about 830, 0.370 moles of isophorone diamine, the adhesive solvent is a 50/50 mixture of toluene and isopropanol and the final total solids content is 75 percent.

Adhesive Lacquer E is prepared by reacting 1.148 moles polyoxypropylene diol having a molecular weight of about 410 and 0.02 moles polyoxypropylene triol having a molecular weight of about 425 and 1.31 moles toluene diisocyanate in 12 parts by weight based on weight of polyols and polyisocyanate, of toluene adhesive solvent at a temperature of 80° C. in the presence of a catalytic amount of dibutyl tin dilaurate. When the percent isocyanate value is approximately 0.65 percent (original NCO content 9.12%), there is added 0.032 moles 1,4-butanediol chain-extending reagent in 25 parts by weight (same weight basis as before) toluene. The chain-extending step is continued to a viscosity endpoint of 2,500 centipoises at 70° C.; terminated by adding 0.2 moles methyl ethyl ketone oxime, and sufficient toluene is added to afford an adhesive lacquer system having a total solids content of 30 percent.

Adhesive Lacquers F-I are prepared in a manner identical to that employed in preparing Adhesive Lacquer E except that there is employed poly(tetramethylene ether)glycol as the polyether polyol as follows:

| Adhesive Lacquer | F | G | H | I |
|---|---|---|---|---|
| Polyether polyol, mols | 1 | 1 | 1 | 1 |
| Idem, mol. wt. | 650 | 650 | 650 | 1000 |
| Toluene diisocyanate, mols | 1.3 | 2 | 4 | 2 |
| 1,4-Butanediol, mols | 0.7 | 1 | 3 | 1 |
| Methyl ethyl ketone | Amount sufficient to afford adhesive lacquer having 40 percent total solids content. | | | |

EXAMPLE I

Adhesive Lacquers A-E are employed to bond aramid fiber to segmented copolyester thermoplastic elastomer. In each of the cases, the aramid fiber is Kevlar (trademark, E. I. duPont deNemours & Co., Inc.) and the segmented copolyester is Hytrel (trademark, E. I. duPont deNemours & Co., Inc.). Hytrel is believed to be the reaction product of dimethylterephthalate, polytetramethylene ether glycol and 1,4-butanediol, and Kevlar is believed to the reaction product of terephtalic acid and p-phenylenediamine. In each instance, the adhesive lacquer is applied to both the aramid fiber and the segmented copolyester elastomer, the coated parts are immediately mated and cured at room temperature employing only sufficient pressure to maintain contact between the fiber and elastomer. The adhesively bonded assemblies are tested for 180° peel strength after standing at room temperature for one, five and nine days. Minimum acceptable peel strength for ambient temperature bonding conditions is 10 PLI. The results are reported in the following Table:

| Polyurethane Adhesive Lacquer | Peel Strength, pounds/linear inch (PLI) | | | |
|---|---|---|---|---|
| | 1 Day | 5 Days | 9 Days | 12 Days |
| A | 3 | 3 | 5 | — |
| B | 6 | 6 | 8 | — |
| C | 2 | 4 | 6 | — |
| D | 3 | 5 | 6 | — |
| E | 8 | 14 | 16 | — |

The data demonstrate that polyether polyurethane adhesive lacquer systems are effective in providing adequate bonding values (>10 PLI) for room temperature bonding of segmented copolyester thermoplastic elastomers to fibrous substrates, particularly aramid fiber substrates. It is noted that Adhesive Lacquers A-D are based on polycaprolactone polyester polyols and each is prepared in an identical manner to Adhesive Lacquer E; however, bond performance of each of the polyester polyurethane adhesive lacquers is inadequate.

EXAMPLE II

To each of Adhesive Lacquers E, F, G, H, I, there is added 5 parts polymethylene poly(phenylisocyanate) per 100 parts of adhesive lacquer. The resulting adhesives are employed to bond polyester fabric to segmented copolyester thermoplastic elastomer at room temperature. The bond data obtained is as follows:

| Adhesive | Peel Strength, pounds/linear inch | | | |
|---|---|---|---|---|
| | 3 Days | 7 Days | 12 Days | 30 Days |
| E | 9 | 16 | — | — |
| F | 14 | — | 30 | 30 |
| G | 13 | — | 20 | 20 |
| H | 11 | — | 28 | 35 |
| I | 14 | — | 21 | 13 |

The data further demonstrate that polyethure polyurethane adhesive lacquer systems prepared in accordance with the herein described inventive concept are effective bonding agents for segmented copolyester thermoplastic elastomers.

What is claimed is:

1. A method of bonding a segmented copolyester thermoplastic elastomer composition consisting essentially of a multiplicity of recurring long chain ester units and short chain ester units joined head-to-tail through ester linkages and a flexible or nonflexible substrate which comprises applying to at least one of said segmented copolyester elastomer or said substrate an adhesive lacquer system comprising organic solvent-carried thermoplastic polyetherurethane, said polyetherurethane having substantially no free hydroxyl moieties and a residual free isocyanate content of no greater than 0.5 percent, said polyurethane being obtained by forming an isocyanate-functional intermediate by reacting an excess of at least one polyisocyanate having at least two isocyanate groups with at least one polyether polyol having at least two hydroxyl groups in an adhesive solvent system until at least about 90 percent of said hydroxy groups have reacted with said isocyanate groups, reacting said isocyanate-functional intermediate in said adhesive solvent system with not more than a stoichiometric amount of at least one difunctional chain extending reagent to a viscosity endpoint corresponding to a molecular weight in the range from about 20,000 to about 200,000 at a residual free isocyanate content not exceeding 0.5 percent by weight based on weight of said polyurethane, and terminating such reaction;

contacting said elastomer and said substrate; and maintaining such contact at a temperature and pressure and for a time sufficient to effect curing of said thermoplastic polyurethane adhesive system.

2. The method of claim 1 wherein said substrate is a fiber-forming condensation polymer.

3. The method of claim 1 wherein said substrate is regenerated cellulose.

4. The method of claim 2 wherein said substrate is aramid fiber.

5. The method of claim 4 wherein said polyether polyol is polytetramethylene ether glycol.

6. The method of claim 4 wherein said polyether polyol comprises a mixture of at least one polyether diol and at least one polyol having at least three hydroxyl groups.

7. The method of claim 6 wherein said polyether diol is poly(oxypropylene) diol and said polyol having at least three hydroxyl groups is poly(oxypropylene) triol.

8. The method according to claim 1 wherein said adhesive lacquer system has incorporated therein at least one free polyisocyanate having at least two isocyanate groups.

9. The method according to claim 8 wherein said free polyisocyanate comprises polymethylene poly(phenylisocyanate).

10. The method according to claim 4 wherein said thermoplastic polyetherurethane adhesive system is cured at ambient temperature.

11. The method according to claim 1 wherein said thermoplastic polyetherurethane adhesive system is cured at a temperature not exceeding the melting point of said segmented copolyester thermoplastic elastomer.

12. The method according to claim 4 wherein said aramid fiber comprises the reaction product of terephthalic acid and p-phenylenediamine.

* * * * *